Dec. 23, 1930.  W. FRASER  1,786,059
AERONAUTICAL INDICATOR
Filed April 12, 1929
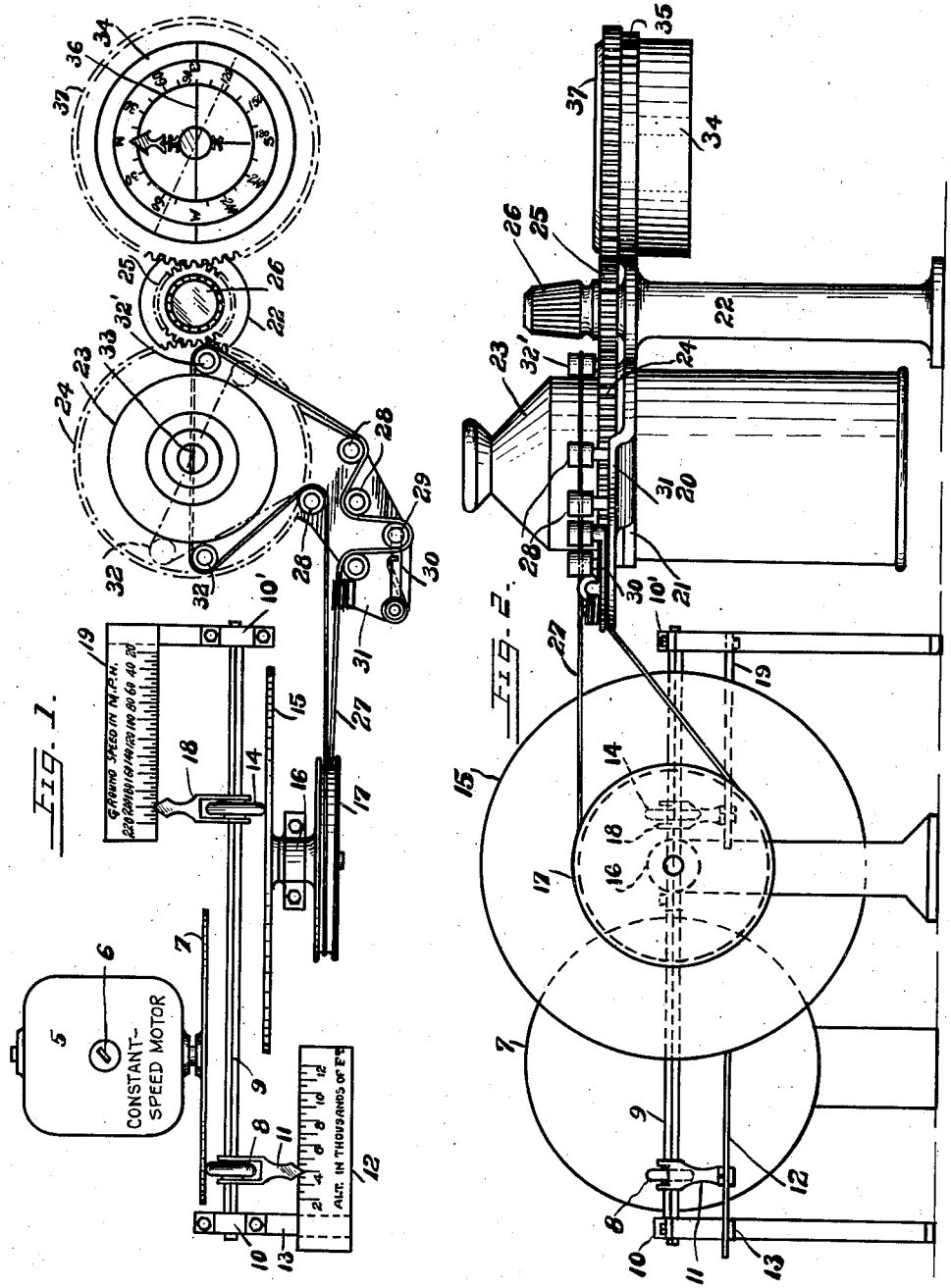
Inventor
WILLIAM FRASER
By Frederick E. Bromley
Attorney.

Patented Dec. 23, 1930

1,786,059

UNITED STATES PATENT OFFICE

WILLIAM FRASER, OF ARVIDA, QUEBEC, CANADA

AERONAUTICAL INDICATOR

Application filed April 12, 1929. Serial No. 354,536.

The invention relates to improvements in aeronautical indicators as described in the present specification and shown in the accompanying drawings which form part of the same.

The invention appertains to an instrument for readily indicating the actual track or ground speed of an aeroplane or other aircraft and also its direction of flight, the instrument being so devised that readings may be taken from indicating scales without having to first make calculations for air-speed and drift.

Referring to the drawings: Figure 1 is a plan view of the invention.

Figure 2 is a side elevation thereof.

Like numerals of reference indicate corresponding parts in each of the figures of the drawings.

In the drawings, the reference numeral 5 indicates an ordinary constant speed motor controllable by a switch 6 or other regulating element. 7 is a friction disc keyed to the motor shaft and engaged with a friction wheel 8 preferably having a rubber rim. This friction wheel is mounted upon a square shaft 9 in a manner to be slidable thereon but rotatable therewith. The shaft may be mounted in bearings as at 10, 10'. A pointer 11 is associated with the wheel 8 so as to be slidable therewith, which pointer operates over a scale 12 graduated to express the altitude in thousands of feet. The scale may be attached to the bearing 10 by means of an arm 13 or suitably mounted in any other manner found desirable.

14 is a further friction wheel likewise mounted upon the shaft 9 and engaged with a friction disc 15 journalled in a bearing 16 and operably connected to a sheave 17. This latter wheel 14 has a pointer 18 that operates over a scale 19 representing the ground speed in miles per hour. The wheel 14 is rotatably mounted.

It will be manifest from this construction that upon setting the motor 5 in operation, rotation of the disc 7 will transmit power to the friction wheel 8 and that by manually shifting this wheel the speed of the shaft 9 may be varied. Likewise, by shifting the wheel 14 the speed of the disc 15 may be varied.

20 is a telescope stationarily mounted in any suitable manner such as by means of the arm 21 of the standard 22. An eye-piece 23 is rotatable and has a ring gear attached to it which is meshed with a pinion 25 constructed integral with or secured to a knob 26. By manually turning the knob the eye-piece 23 may be turned in either direction.

27 is a thread or cord passed around the sheave 17 and guide pulleys as at 28. One of these guide pulleys, as at 29, is a tensioner and comprises a spring pressed arm 30 pivotally mounted on the bracket 31 which forms a part of the arm 21. A pair of the pulleys 32, 32' are so arranged upon opposite sides of the eye-piece 23 that a portion of the cord 33 stretched therebetween extends diametrically through the eye-piece and appears to be superimposed upon the landscape. The pulleys 32, 32' are rotatable with the eye-piece 23 so that the direction of the thread 33 may be varied angularly in order to adjust it to coincide with the direction of flight respective to the ground.

34 is a compass mounted in an arm 35 of the standard 22 or in any other suitable manner. This compass is preferably of the floating card spirit type and is compensated for a drift by means of the telescope and its adjustable lubber line 36. 37 is a ring gear secured to the movable part of the compass that carries the lubber line 36 which gear is meshed with the pinion 25.

In the use of this invention, to ascertain the ground speed the indicator 11 is first set to correspond to the reading of the altitude meter; the motor 5 is set in operation and the speed of the travel of the visible portion 33 of the thread 27 is observed through the eye-piece of the telescope 20. The speed of the thread is adjusted by shifting the friction wheel 14 until it concides with the rate of movement of the ground as observed through the eye-piece 23 whereupon the reading of the ground speed is taken on the scale 19.

The direction of flight is ascertained by turning the knob 26 until the visible portion of the thread 33 assumes a parallel position with respect to the passage of the ground as observed through the eye-piece 23 of the telescope. As the compass 34 is connected to the telescope it is turned coincidentally therewith so that its lubber line 36 indicates the direction of flight.

What I claim is:—

1. An aeronautical indicator of the class described comprising a downwardly directed telescope having a rotary eye-piece, a pair of pulleys disposed on diametrically opposite sides of said eye-piece, a stationary support situated laterally of said telescope, a series of pulleys mounted on said support, a rotatably mounted sheave wheel, an endless thread trained over all of the aforesaid pulleys and said sheave wheel, said thread having a portion of its length diametrically extending through said telescope eye-piece, and means for driving said sheave wheel and varying its speed.

2. An aeronautical indicator of the class described comprising a telescope directed downwardly for ground observation, a sheave, guide pulleys, an endless thread trained around said sheave and the guide pulleys, certain of the pulleys being so arranged that a portion of the thread diametrically extends through the telescope, a disc rotatably journalled and connected to the sheave, a journalled shaft, a friction wheel slidably mounted thereon and held against independent rotation, said friction wheel being engaged with said disc, a pointer mounted on said shaft and shiftable therealong together with the friction wheel, a flat scale so positioned as to be traversed by said pointer, a further friction wheel likewise mounted upon said shaft, a disc engaged therewith, a constant speed electric motor rotatably carrying this disc, a further pointer mounted on said shaft and shiftable therealong together with the latter friction wheel, and a flat scale so positioned as to be traversed by the latter pointer.

Signed at Toronto, Ontario, the 1st day of April, 1929.

WILLIAM FRASER.